(12) United States Patent
Lanning et al.

(10) Patent No.: US 8,850,970 B2
(45) Date of Patent: *Oct. 7, 2014

(54) ENGINEERED WOODY BIOMASS BALING SYSTEM

(75) Inventors: David N. Lanning, Federal Way, WA (US); James H. Dooley, Federal Way, WA (US); Christopher J. Lanning, Federal Way, WA (US); James L. Fridley, Seattle, WA (US)

(73) Assignee: Forest Concepts, LLC, Auburn, WA (US)

( * ) Notice: Subject to any disclaimer, the term of this patent is extended or adjusted under 35 U.S.C. 154(b) by 1029 days.

This patent is subject to a terminal disclaimer.

(21) Appl. No.: 12/887,916

(22) Filed: Sep. 22, 2010

(65) Prior Publication Data

US 2012/0067229 A1 Mar. 22, 2012

(51) Int. Cl.
*A01F 15/02* (2006.01)
*B30B 9/30* (2006.01)

(52) U.S. Cl.
CPC .............. *B30B 9/3032* (2013.01); *B30B 9/301* (2013.01); *B30B 9/3014* (2013.01)
USPC ........................................... 100/50; 100/245

(58) Field of Classification Search
USPC ......... 100/43, 50, 100, 178, 179, 188 R, 215, 100/218, 240, 245; 56/341
See application file for complete search history.

(56) References Cited

U.S. PATENT DOCUMENTS

| | | |
|---|---|---|
| 3,827,353 A | 8/1974 | Isberg |
| 3,911,519 A | 10/1975 | Anlas et al. |
| 4,036,359 A | 7/1977 | Stricklaand, Jr. |
| 4,148,253 A | 4/1979 | Thompson et al. |
| 4,377,362 A | 3/1983 | Meinke |
| 4,463,667 A | 8/1984 | Jones |
| 4,467,712 A | 8/1984 | Fincham |
| 4,572,064 A | 2/1986 | Burton |
| 4,630,535 A | 12/1986 | Haygreen |
| 4,936,206 A | 6/1990 | Miles et al. |
| 4,991,498 A | 2/1991 | McCurdy |
| 5,090,177 A | 2/1992 | Gombos et al. |

(Continued)

FOREIGN PATENT DOCUMENTS

| | | |
|---|---|---|
| WO | WO 92/07762 A1 | 5/1992 |
| WO | WO 2007/138165 A1 | 12/2007 |

OTHER PUBLICATIONS

Kaliyan, N., et al., Constitutive model for densification of corn stover and switchgrass, Biosystems Engineering 104(1), Sep. 2009.

(Continued)

*Primary Examiner* — Jimmy T Nguyen
(74) *Attorney, Agent, or Firm* — Thomas F. Broderick

(57) ABSTRACT

A woody biomass baler having a baling chamber adapted to receive woody biomass material, a compression system adapted to compact the material into a rectangular bale in the chamber, and an ejection system adapted to move the bale from the chamber, wherein each baling chamber wall can withstand a minimum distributed force perpendicular to the wall of at least $(0.11 \times P_p \text{ psi} \times A_w)$ pounds, wherein $P_p$ is the maximum pressure that the compression system can apply to the material and $A_w$ is the area of the wall expressed in square inches, and wherein the compression system can apply at least one platen pressure between 26 psi and 126 psi to the material.

21 Claims, 6 Drawing Sheets

(56) References Cited

U.S. PATENT DOCUMENTS

| | | | |
|---|---|---|---|
| 5,243,901 A | 9/1993 | Green | |
| 5,487,258 A | 1/1996 | McNabb | |
| 6,189,443 B1 | 2/2001 | Hilford | |
| 6,427,585 B1 | 8/2002 | Brown et al. | |
| 6,485,774 B1 | 11/2002 | Bransby | |
| 6,779,570 B2 | 8/2004 | Tardif | |
| 6,820,542 B1 | 11/2004 | Truitt | |
| 7,987,776 B1 * | 8/2011 | Lanning et al. | 100/35 |
| 8,430,025 B2 * | 4/2013 | Lanning et al. | 100/50 |
| 2005/0132667 A1 | 6/2005 | McLeod et al. | |
| 2005/0145115 A1 | 7/2005 | Garcia | |
| 2006/0086419 A1 | 4/2006 | Aikins et al. | |
| 2007/0157825 A1 | 7/2007 | Miller | |
| 2009/0007537 A1 | 1/2009 | Savoie et al. | |
| 2009/0242077 A1 | 10/2009 | Prohaska | |
| 2010/0005980 A1 | 1/2010 | Ashby | |
| 2010/0011717 A1 | 1/2010 | Rivard | |

OTHER PUBLICATIONS

Bransby, D., et al. Yield effects on bale density and time required for commercial harvesting and baling of switchgrass, prepared by Oak Ridge National Laboratory, prepared for 7th National Bioenergy Conference, Nashville, Tennessee, Sep. 15-20, 1996.

Shinners, K.J., et al., Drying, harvesting and storage characteristics of perennial grasses a biomass feedstocks, ASABE Paper No. 061012, Jul. 2006.

Planting and growing miscanthus, Best practice guidelines for growing miscanthus under the Bioenergy Scheme (BES), Irish Department of Agriculture, Fisheries & Food, 2009.

Austin, A., Researchers evaluate biomass handling solutions, Biomass Magazine, posted Dec. 16, 2009.

Kemmerer, B.D., Spring switchgrass harvest with a New Holland large square baler, ASABE Paper No. 1009029, Jun. 20, 2010.

Miles, T.R., and Miles, T.R. Jr., Densification Systems for Agricultural Residues, Chapter 14 in ACS Symposium Series, No. 130, Thermal Conversion of Solid Wastes and Biomass, American Chemical Society, 1980.

Groothius, MD, et al., Compaction experiences with bulk-format switchgrass in commercial transfer stations, ASABE Paper No. 110819, Aug. 7-10, 2011.

Prince, R. P., et al., Shear stress and modulus of elasticity of selected forages, Transactions of the ASAE, pp. 426-429, 1969.

Mohsenin, N.N., Physical properties of plant and animal materials, vol. I Structure, physical characteristics and mechanical properties, Gordon and Breach Science Publishers, NY, pp. 88-90, 93, 103-106, 208-209, 688, 730, 1970.

Mäkelä, Markku. Oksaraaka-aineen kasaus ja kuljetus. [Bunching and transportation of branch raw material]. Folia Forestalia No. 237. Metsantutkimslaitos, Institutum Forestale Fenniae. Helsinli, Finland; pp. 1-19, 1975.

Hassan, A. E-D., Compaction of Wood Chips—Energy Cost, ASABE Paper No. 76-1568, pp. 1-17, 1976.

Danielsson, B. O., et al., Compressing small trees and tree components. Report Nr119-1977. Garpenberg, Sweden, Department of Operational Efficiency, Royal College of Forestry, pp. 1-47, 1977.

Jolley, J.D., Analysis of baling concept for increased fiber recovery on harvested forest sites. M.S. Thesis, Virginia Polytechnic Institute and State University, pp. i-vii and 1-101, 1977.

Stuart, W. B., and T.A. Walbridge, A new approach to harvesting, transporting, and storing logging residues, pp. 74-83, 1978.

Porter, C. D., The economic feasibility of modifying six conventional harvesting systems to recover logging residues for fuel and fiber, M.S. Thesis, Virginia Polytechnic Institute and State University, 1979.

Topp, R. A., The development of an infeed concept for the woods residue baler, M. S. Thesis, Virginia Polytechnical Institute and State University, pp. 1-38, Jun. 1979.

Carlsson, T., et al., Lastbilstransport av stubbar, träd, träddelar och hyggesavfall—resultat av studier 1977-79 [Trucking of stumps, full trees, tree sections and logging residue—Study results, 1977-1979], Redogörelse Nr 1 1980, Forskningsstiftelsen Skogsarbeten [Logging Research Foundation, Sweden], Stockholm, Sweden, 36 pages, Mar. 1980.

Sturos, J.A. 1982. Innovative yard handling for integrated utilization of whole-tree and forest residual biomass. Weyerhaeuser Science Symposium No. 3, Forest to Mill—challenges of the future, 1980.

Sinclair, A. W. J., Utilization of coastal British Columbia log sortyard debris, Technical Report No. TR-46, Forest Engineering Research Institute of Canada (FERIC), Apr. 1981.

Gleason, A. P., 1981, The development of an infeed mechanism and strapping device for the forest residue. M. S. Thesis, Virginia Polytechnic Institute and State University, Jun. 1981.

Stuart, W. B., et al., Economics of modifying harvesting systems to recover energy wood, Forest Products Journal 31(8)37-42, 1981.

Säll, H-O., VI Development of harvesters for energy forest plantations, pp. 118-131, In: Proceedings of the International Conference "Harvesting and Utilization of Wood for Energy Purposes" at ELMIA, Jöhköping, Sweden, Sep. 29-30, 1980.

Walbridge, T.A., and W.B. Stuart. VII An alternative to whole tree chipping for the recovery of logging residues, pp. 132-148, In: Proceedings of the International Conference "Harvesting and Utilization of Wood for Energy Purposes" at ELMIA, Jöhköping, Sweden, Sep. 29-30, 1980.

Larsson, M., Development of transportation systems for logging residues, stumps and trees in Sweden, pp. 166-183, In: Proceedings of the International Conference "Harvesting and Utilization of Wood for Energy Purposes" at ELMIA, Jöhköping, Sweden, Sep. 29-30, 1980.

Jones, K. C. and Associates. A review of energy requirements to commute woody biomass. ENFOR Project P-28. FERIC Special Report No. SR-14. Canadian Forestry Service, Environment Canada, Ottawa, Ont., 1981a.

Jones, K. C. and Associates. Field tests to develop energy saving wood comminution techniques. ENFOR Project P-28. FERIC Special Report No. SR-15. Canadian Forestry Service, Environment Canada, Ottawa, Ont., 1981b.

Miles, J. A., et al., New approaches to harvesting chaparral for energy, Gen. Tech. Rep. PSW-58, Berkeley, CA; Pacific Southwest Forest and Range Experimental Station, Forest Service, U.S. Department of Agriculture, 1982.

Scheiss, P., et al., Evaluation of new concepts in biomass fiber field processing and transportation, in Sarkanen, K. V., et al. (Eds.), Progress in Biomass Conversion, vol. 3, Academic Press, 1982.

Vidrine, C. G., et al., Bulk densities of materials from selected pine-site hardwoods, Forest Products Journal 32(7):21-24, Jul. 1982.

Schiess, P., and K. Yonaka., Baling—a new concept in residue handling; Proceedings, First Technical Conference on Timber Harvesting in Central Rockies, Ft. Collins, 29 pages, Jan. 4-6, 1983; pp. i-iii and 1-26. [1983a].

Yonaka, Keith D., Field evaluation of baling whole trees and residue as an alternative method of materials handling, M. S. Thesis, University of Washington, pp. 1-102, 1983.

Balatinecz, J. J., The potential role of densification in biomass utilization, Biomass Utilization 67:181-191, 1983.

Schiess, P., and W.E. Stuart; Baling of whole trees and-or residue as an alternative to in-woods chipping and-or residue treatment; Final Report, 1983; pp. i-iii and 1-87. [1983b].

Schiess, P., and K. Yonaka; Evaluation of industrial baling techniques for forest residue; Final Report; 1983; pp. i-iv and 1-67. [1983c].

Fridley, J. L., and T. H. Burkhardt, Densifying forest biomass into large round bales, Transactions of the ASAE 27(5) 1277-1281, 1984.

Jenkins, B.M., et al., A module system for harvesting tree prunings, Applied Engineering in Agriculture 1(1)32-34, Jun. 1985.

Zohns, M. A., A device to cut modules of tree prunings, Applied Engineering in Agriculture 1(1)28-31, Jun. 1985.

Guimier, D.Y., Evaluation of forest biomass compaction systems. Special Report No. SR-30, ENFOR Project P-313, Ottawa, CA, pp. i-vii and 1-62, Aug. 1985.

Pottie, M.A., and D.L. Guimier, Preparation of forest biomass for optimal conversion, FERIC Special Report No. SR-32, pp. i-viii and 1-112, Oct. 1985.

(56) References Cited

OTHER PUBLICATIONS

Sitkei, G., Mechanics of agricultural materials, Developments in Agricultural Engineering (Netherlands), No. 8, Elsevier, 487 p. 1986.
Pottie, M.A., and D.L. Guimier, Harvesting and transport of logging residuals and residues, FERIC Special Report No. SR-33, pp. i-xi and 1-100, May 1986.
Stokes, B. J., et al., Preliminary evaluation of steel-roller round baler for woody biomass baling, In- Proceedings of the 9th Annual Meeting of the Southern Forest Biomass Workshop; Jun. 8-11, 1987; Biloxi, MI; 167-174.
O'Dogherty, A review of the mechanical behavior of straw when compressed to high densities, J. Agric. Engng Res. 44:241-265, 1989.
McDonald, TP, et al., Effect of product form, compaction, vibration and comminution on energywood bulk density, In: Proceedings of a Workshop on Preparation and Supply of High Quality Wood Fuels; Jun. 13-16, 1994; Garpenberg, Sweden: IEA/BA Task IX; 6-23.
Angus-Hankin, C., et al., The transportation of fuelwood from forest to facility, Biomass and Bioenergy 9(1-5)191-203, 1995.
Hoyne, S., et al., Forest residues: Harvesting, storage and fuel value, CONFORD Project Report, Dublin, IE, May 2001.
Wood Handbook—Wood as an engineered material, Forest Products Laboratory, USDA Forest Service, Madison, WI, 2002, pp. 60-61 and 64-65.
Van Pelt, T. J., Biomass densification, BSAE, pp. 1-21, May 2002.
Sokhansanj, S., et al., Collection and delivery of biomass for fuel and power production, Agricultural Engineering International, the CIGR Journal of Scientific Research and Development, Invited Overview Paper, vol. V, Feb. 2003.
Van Pelt et al., Maize, soybean, and alfalfa biomass densification, Agricultural Engineering International, the CIGR Journal of Scientific Research and Development, Manuscript EE 03 002, May 2003.
Afzalinia, S., Modeling and validation of the baling process in the compression chamber of a large square baler, Ph.D. Thesis, University of Saskatchewan, SK, Canada, May 2005.
Lechasseur, G., et al., Cutting, bundling and chipping short-rotation willow, CSAE/SCGR 2005 Meeting, Winnipeg, Manitoba, CA, Jun. 26-29, 2005.
Savoie, P., et al., Development of a cutter-shredder-baler to harvest long-stem willow, ASABE Paper No. 061016, 9 pages, Jul. 9-12, 2006.

Jenkins, J. A., et al., Harvesting and handling agricultural residues for energy, Transactions of the ASAE 29(3)-833-836, May-Jun. 1986.
Jenkins, B. M., Physical properties of biomass, In: Biomass Handbook, Eds: Kitani and Hall, Gordon and Breach Science Publishers, New York, NY, pp. 860-891, 1989.
Dooley, J.H., et al., Technology to enable utilization of biomass from wildland-urban interface fuels reduction projects. Phase II: Field evaluation of baling v. chipping. Mar. 1, 2006.
Dooley, J. H., et al., Utilization of biomass from WUI fuels reduction—Biomass collection and handling from wildland-urban intermix projects on residential and suburban properties; Poster, May 16, 2006.
Dooley, J.H., et al., Large rectangular bales for woody biomass; Paper No. 068054, presented at the 2007 ASABE Annual International Meeting, Portland, OR, Jul. 9-12, 2006.
Dooley, J. H., et al., Transportation of biomass from wildland urban intermix (WUI)—Biomass preprocessing and handling to reduce cost of transportation and add value; poster, 2007.
Lanning, D. N., et al., Engineering factors for biomass baler design; ASABE Paper No. 078047, presented at the 2007 ASABE Annual International Meeting, Minneapolis, MI, Jun. 17-20, 2007.
Lanning, D., et al., Baling to improve transport of biomass from urban areas; poster presented at the Forest Innovation Conference, Missoula, MT, Apr. 25, 2008.
Dooley, J. H., et al., Biomass baling into large square bales for efficient transport, storage, and handling; paper presented at the Council on Forest Engineering 2008: 31st Annual Meeting, Jun. 22-25, 2008 Charleston, SC.
Dooley, J. H, et al., Square bales of woody biomass for improved logistics, paper presented at the 2009 Society of American Foresters National Convention, Sep. 30-Oct. 4, 2009, Orlando, Florida.
John Deere 1490D Energy Wood Harvester, 2009.
Supertrak WB55 Biobaler, 2009.
Sokhansanj, S., and L.O. Pordesimo, Adaptation of forage handling systems for collecting biomass feedstock. ASAE Paper No. 026060, 2002.
Shigley, J. E., Mechanical Engineering Design, McGraw Hill Book Company, NY, pp. 210-214, 1963.
Byers, E., et al., Biomass Automated Densification Device—B A D D, Senior Project in Biosystems Engineering, University of Tennessee, May 2008.

* cited by examiner

ENGINEERED WOODY BIOMASS BALING SYSTEM

STATEMENT OF GOVERNMENT LICENSE RIGHTS

This invention was made with government support by the CSREES Small Business Innovation Research program of the U.S. Department of Agriculture, grant numbers 2005-33610-15483 and 2006-33610-17595. The government has certain rights in the invention.

FIELD OF THE INVENTION

Our invention relates to harvesters, particularly balers, and provides a baling system engineered to predictably and reproducibly produce rectangular bales of woody biomass at optimum transportation densities, and more particularly to baling chambers of sufficient strength to withstand the Poisson's ratio effect of woody biomass when compressed to such densities.

BACKGROUND OF THE INVENTION

Woody biomass is a core element of our nation's strategy to replace imported oil and natural gas with renewable resources. Approximately two hundred million tons of wood waste is generated by the forest products and paper industries, most of which is being used for co-products or energy. Additionally, more than one hundred million tons of woody biomass is available, but not currently used, per year from forest management, wildfire fire protection, and urban woody debris. As forested landscapes in rural and urban areas are more intensively managed in the future, the amount of available woody biomass will increase.

Woody biomass has low bulk density, and so machinery has been developed to collect and compact woody biomass into transportable bundles, bales, modules, and containers. Pioneering research was undertaken in Scandinavia (Mäkelä 1975; Danielsson 1977; Carlsson 1980; Säll 1981; Larsson 1981) and Canada (Sinclair 1981; Jones 1981a, 1981b).

In the United States, Dr. Awatif Hassan at North Carolina State University early on investigated the energy consumption for a wood chip compaction system (Hassan 1976). Dr. William Stuart at Virginia Polytechnic and State University was among the early U.S. developers of forest biomass balers (Stuart and Walbridge 1978). His baler was brought to the University of Washington in 1982 for testing by Dr. Peter Schiess (Schiess and Yonaka 1983). Concurrently, James Fridley and Dr. Thomas Burkhardt at Michigan State University worked to adapt round agricultural balers to handle forest biomass (Fridley and Burkhardt 1984). Unfortunately, both projects stopped when the price of oil began to fall and public interest in biomass energy waned.

Fortunately, much of that initial flurry of research was documented in conference proceedings and review articles (Sturos 1982; Guimier 1985). Guimier compared the potential of five existing systems (round agricultural baler, square baler, garbage truck, garbage compactor, and cotton module builder). His team found that square bales of the type made by recycling balers and large cotton modules showed the most promise.

Renewed interest in woody biomass as a fuel and feedstock during the 1990's stimulated a number of development programs around the globe. Baling, chopping, and intermodal bulk hauling are being concurrently developed, with each being an optimal solution for particular circumstances. Chopping and intermodal bulk hauling are particularly attractive for very short haul distances. However, once the haul distance exceeds about 35 miles (60 km), the need for high bulk density solutions becomes apparent.

Baling woody biomass to achieve high bulk density is being pursued by three technical approaches, again each approach being preferred for particular situations. Timberjack, now John Deere Forestry, has commercialized a biomass bundling system that was developed in Finland to enable forest materials to be handled similar to logs. Dr. Philippe Savoie's team in Canada has been developing round baling for woody biomass crops such as willow (Savoie et al. 2006), and more recently with SuperTrak has adapted the round bale technology for use in forestlands to cut and collect understory saplings and brush. Round bales can be collected, transported and handled like round bales of hay. The third technology, rectangular balers is the subject of this patent application.

The present inventors have reported their progress under a federal contract from the USDA CSREES SBIR program to develop better methods to collect and transport woody biomass (Dooley 2006; Lanning 2007; Dooley 2008; Dooley 2009). Our goal has been to engineer more efficient recovery and transport of woody biomass to second-generation bioenergy and biofuel plants.

SUMMARY OF THE INVENTION

We have elucidated the three rheological properties of woody biomass material requisite to predictably and reproducibly bale woody biomass at preselected optimum transportation densities while minimizing fossil fuel consumption during baling, handling, and transport.

First, we have empirically determined the baled bulk density ($lb/ft^3$) v. platen pressure (psi) curves for woody biomass at various moisture contents. These relationships indicate the target compression platen pressures that will compress woody biomass to predetermined transport densities.

Second, we have empirically determined that woody biomass material compressed to optimum transport densities has a Poisson's ratio effect of about 11%. This value is required to determine the minimum mechanical strength of baling chamber sidewalls for producing woody biomass bales of optimum transport densities.

Third, we have observed that green woody biomass material compressed to optimum transport densities has a coefficient of friction against steel baling chamber walls of approximately 0.60. This value is necessary, in conjunction with both the target compression platen force and the Poisson's ratio, to determine the minimum platen pressure required to form and eject a compacted bale of woody biomass from the baling chamber.

These three discoveries permit one of ordinary skill to design and manufacture robust, lightweight and economical rectangular balers to produce woody biomass bales optimized for transport on conventional semi-trailer trucks to bioenergy and biofuel plants.

Accordingly, the invention provides a woody biomass baler having a baling chamber adapted to receive woody biomass material and a compression system adapted to compact the material into a rectangular bale in the chamber, wherein the baling chamber has a front wall that acts as a reciprocating compression platen corresponding in dimensions to the width W and height H of the bale, opposing upper and lower walls corresponding in dimensions to the length L and either of the W and H of the bale, and opposing sidewalls corresponding in dimensions to the L and the other of the W and H of the bale, wherein each chamber wall selected from among the upper wall, the lower wall, and each of the sidewalls can withstand a minimum distributed force perpendicular to the selected wall of at least $(0.11 \times P_p \text{ psi} \times A_w)$ pounds, wherein $P_p$ is the maximum pressure that the compression system can apply to the material and $A_w$ is the area of the selected wall expressed in square inches.

In a representative embodiment, each of the selected chamber walls is designed and fabricated to withstand a distributed force perpendicular to the selected wall of between $(0.11 \times P_p \text{ psi} \times A_w)$ pounds and $(0.5 \times P_p \text{ psi} \times A_w \times SF)$ pounds, wherein SF is a safety factor calculated by dividing the predetermined design failure load of the compression platen by $P_p$.

In a representative embodiment, the compression system can apply at least one platen pressure between 26 psi and 126 psi to the material. Preferably the compression system can apply at least one platen pressure between 46 psi and 86 psi to the woody biomass material in the baling chamber. Most preferably, the compression system can apply at least one platen pressure between 50 psi and 71 psi to the material.

The woody biomass baler can include a loading system, e.g., a knuckle boom loader, adapted to introduce woody biomass material into the baling chamber, an ejection system adapted to move the bale from the chamber, and may incorporate a tying system adapted to automatically tie the bale of compacted woody biomass material.

The baling chamber may be open-ended, or closed by a back wall corresponding in dimensions to the front wall. The back wall may be reversibly opened, in which case the ejection system should apply a force greater than or equal to $(0.132 \times P_p \times L)(H+W)$ pounds to move the bale through the opened back wall, wherein L, H, and W are expressed in inches.

At least one of the chamber walls selected from the sidewalls, the upper wall, and the lower wall may be reversibly opened, in which case the ejection system should apply a force greater than or equal to $(P_p \times W)(1.2H+0.132L)$ pounds to move the bale through the opened sidewall, and/or greater than or equal to $(P_p \times H)(1.2W+0.132L)$ pounds to move the bale through the opened upper or lower wall, wherein W, H, and L are expressed in inches.

For stackability, either or both L/W and L/H should be equal to or greater than 1.5, and preferably equal to approximately 2.

DETAILED DESCRIPTION OF THE PREFERRED EMBODIMENT

The terms "parallelepiped" and "rectangular" are used interchangeably herein to refer to a solid shape bounded by six substantially square or rectangular faces in which each pair of adjacent faces meets in a substantially right angle.

Figure 1:
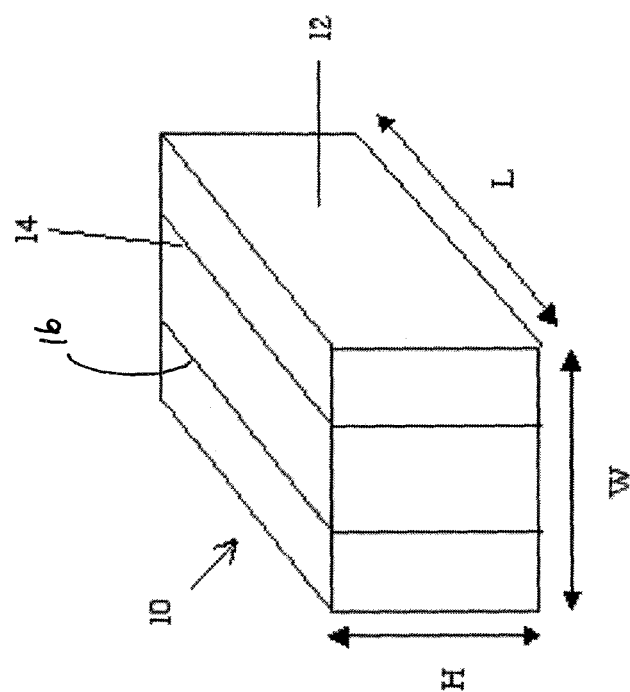
FIG. 1 shows a perspective view of a representative woody biomass bale.

The term "bale" as used herein refers to a parallelepiped-shaped bundle of compressed and bound biomass. FIG. 1 depicts a representative bale 10 of compressed woody biomass 12 bound with a plurality of loops of binding material 14. Dimension W is perpendicular to the plane created by the binding material that encircles the compressed woody biomass. Dimension H is perpendicular to W and in line with the binding material. Dimension L is perpendicular to the plane created by W and H. Binding material is parallel to L. Representative binding materials include wire, polypropylene twine, and banding straps. For stackability, bale compression is preferably along the L axis, most preferably with the biomass material disposed substantially along the W axis, transecting the binding material plane.

The term "woody biomass" as used herein refers to all parts of trees, shrubs and woody plants useable as industrial feedstocks for fiber, bioenergy, and biofuels, including timber harvest slash and land clearing debris, small-diameter trees, shrubs and brush, dedicated energy crops like willow and poplar, tree service prunings, and residential green waste.

The term "cellulosic biomass" as used herein refers more generally to encompass all plant materials compacted/compressed by baling for use as industrial feedstocks, including woody biomass, energy crops like switchgrass, miscanthus, and hemp, and agricultural crop residues including corn stover.

The term "green weight" as used herein refers to the weight of freshly harvested woody biomass that has substantially the same moisture content, typically 40-55 percent wet-weight-basis (% wwb), as the stranding plants. The term "equilibrium weight" refers to the eventual weight of woody biomass that has dried in bales under ambient conditions to an equilibrium moisture content, typically 10 to 18% wwb in the Pacific Northwest and less that 10% wwb in drier regions. "Dry weight" as used herein refers to the weight of woody biomass after drying to constant weight at 221° F. (105° C.).

The term "semi-trailer truck" as used herein refers to an articulated rig consisting of a towing engine ("tractor") coupled to a single "semi-trailer" (a trailer without a front axle), or to a "double trailer" consisting of a semi-trailer coupled to either another semi-trailer or a "full trailer" (a trailer supported by front and rear axles), or to a 'triple trailer" consisting of a semi-trailer coupled to two full trailers. As used herein, the term "semi rig" refers to a tractor & semi-trailer combination, commonly a 10-wheeled tractor coupled to an 8-wheeled trailer; and the terms "double rig" and "triple rig" refer to tractors pulling two and three trailers, respectively. The term "fleet" refers to a group of semi-trailer trucks owned or leased by a business or government agency.

The overall weight of a particular semi-trailer truck empty of cargo is referred to herein as "curb weight."

The term "cargo" as used herein refers to a plurality or multiplicity of parallelepiped bales of woody biomass that are loaded for transport on or in the one or more trailers of a semi-trailer truck. The term "payload" refers to the weight, volume, and density characteristics of the cargo. The terms "payload weight" and "payload volume" refer to the weight and volume of the cargo, respectively.

The term "Gross Vehicle Weight (GVW)" as used herein refers to the total weight of a semi-trailer truck and everything aboard, including cargo. The federal maximum GVW for semi-trailer trucks is 80,000 pounds. Double and triple rigs must additionally comply with the following federal bridge protection formula.

The term "Federal Bridge Gross Weight Formula" as used herein refers to FMC SA regulation §658, which is hereby incorporated by reference in its entirety. This regulation limits the amount of weight that can be put on each of a double or triple rig's axles, and how far apart the axles (or groups of axles) must be to legally carry a given weight, expressed by the formula:

$$W = 500((LN/N-1) + 12N + 36)$$

wherein W is the overall gross weight on any group of two or more consecutive axles to the nearest 500 pounds, L is the distance in feet between the extreme of any group of two or more consecutive axles, and N is the number of axles in the group under consideration.

As used herein the terms "maximum transport volume" and "maximum transport weight" refer to the maximum volume and weight of cargo, respectively, that a particular semi-trailer truck can legally transport. The maximum transport weight is determined by subtracting the curb weight of the semi-trailer truck from the maximum allowable GVW of the truck. The term "optimal transport density" refers to the computed density (weight/volume) of a cargo that has both the maximum legal transport volume and the maximum legal transport weight. Such an optimized cargo is said to "cube out" the legal payload of a semi-trailer truck.

In ordinary circumstances, a tractor-coupled semi-trailer will weigh about 35,000 pounds, leaving about 45,000 pounds of payload capacity. The cargo space available on or in a semi-trailer is normally 48 or 53 feet long and about 8 foot 4 inches wide and 8 foot 10 inches high. These general constraints give an optimal transport density range of 12.7 to 11.5 lb/ft$^3$. In practice, however, maximum transport weight and volume limits depend specifically on a particular semi-trailer truck's curb weight, trailer configuration, and travel route on federal and state highways.

For example, the California Department of Transportation has relatively strict regulations on weight and size limits for highway transportation vehicles. Semi-trailers are limited to 48 or 53 feet maximum length; and each trailer in a double trailer cannot exceed 28 feet 6 inches in length. For illustrative purposes, we describe an optimized bale size and density for cargo transport on a 48-foot semi-trailer in the state of California. Considering payload volume, a 14-foot maximum allowable load height leaves 8 to 9 feet of useable cargo space. We assume an 8-foot cargo height and an 8-foot loading width, leaving buffer spaces for pallets, tarps, and straps. The exemplary volume, then, of cargo that can be transported on a semi-trailer in California (without special permits) is 48 ft×8 ft×8 ft equaling 3072 cubic feet.

With this information we can determine appropriate bale sizes for truck transport of woody biomass on California highways. Table 1 lists several suitable bale configurations, sized for different businesses and woody biomass sources.

TABLE 1

| Baler size | Bale size L × W × H (inches) | 48 ft. trailer payload L × W × H (bales) | # bales | Bale L/W ratio |
|---|---|---|---|---|
| Landscaper | 24 × 16 × 24 | 24 × 16 × 4 | 576 | 1.5 |
| Small contractor | 48 × 32 × 32 | 12 × 3 × 3 | 108 | 1.5 |
| Large contractor | 64 × 48 × 32 | 9 × 2 × 3 | 54 | 2.0 |
| Forest baler | 96 × 48 × 48 | 6 × 2 × 2 | 24 | 2.0 |

For example, 54 woody biomass bales sized 64×48×32 inches will cube out the exemplary 3072 ft$^3$ payload volume of a 48-ft semi trailer. To maximize packing efficiency, bale configurations are preferably selected so that trailer dimensions are evenly divisible by bale dimensions. In this example the trailer length is divisible without remainder by the bale length dimension, and likewise trailer width by bale width, and trailer height by bale height.

Woody biomass bales should preferably have an L/W and/or L/H ratio(s) of at least 1.5, as we have observed that smaller ratios tend to produce egg-shaped bales rather than consistently stackable, rectangular bales. Most preferably, L/W and/or L/H ratio(s) of approximately 2 advantageously permit the bales to be stably interlocked on pallets or in stacks. We note that finished bale dimensions will increase by the amount of stretch in the chosen binding material, e.g., polypropylene twine stretches under load more than steel wire. Consequently the baling chamber walls (discussed below) can be dimensioned accordingly shorter, to accommodate the anticipated stretch of particular binding materials.

Figure 2:
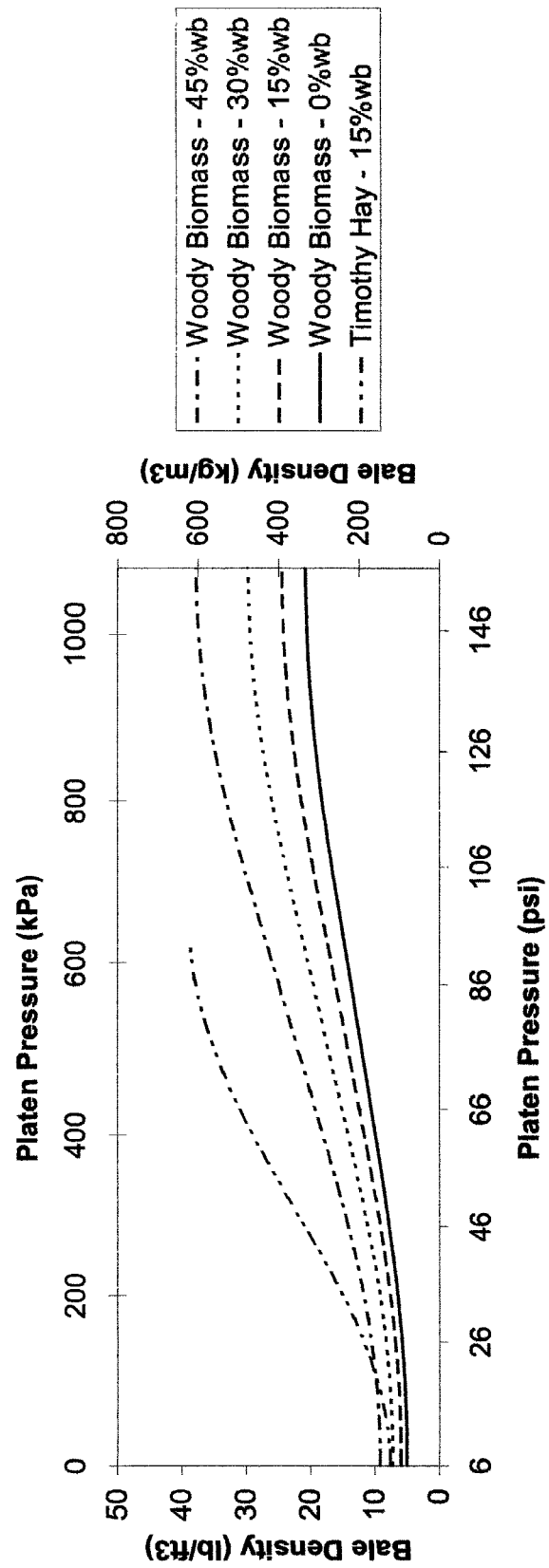
FIG. 2 is a graph that contrasts the density v. platen pressure curves of woody biomass (at 45% wwb, 30% wwb, 15% wwb, and dry weight) and timothy hay (at 15% wwb)

Considering payload weight, a typical semi rig payload legal in California is 44,000 to 48,000 pounds. Combining these volume and weight constraints gives an optimum transport density range of 14.3 to 15.6 lb/ft$^3$. Assuming a maximum payload weight of 45000 lbs, 54 woody biomass bales sized 64×48×32 inches with an average green density of 14.6 lb/ft$^3$ will cube out the truck. FIG. 2 indicates that green woody biomass can be compressed to a density of about 14.6 lb/ft$^3$ by a platen pressure force (i.e., baler system pressure applied to the platen times the area of the platen in inches) of about 50 psi. However, transporting such green woody biomass bales over long distances would be far from optimal, as this green payload would contain some ten tons of noncombustible water. Drying the bales prior to long-haul transport significantly increases the energy content of the woody biomass payload, but to predictably cube out the truck with dried woody biomass the green woody biomass must be baled at predetermined higher initial densities, for example as shown in Table 2.

TABLE 2

| | Bale at _% wwb ship at _% wwb | Bale Size: 64 × 48 × 32" Vol (ft$^3$) | Wt (lbs) | lbs/ft$^3$ | Baler Platen Pressure | 48 foot trailer payload L × W × H (bales) | # bales | lbs | % V | % W | Btu (×10$^6$) |
|---|---|---|---|---|---|---|---|---|---|---|---|
| 1a | 45 45 | 57 | 833 | 14.6 | ~50 psi | 9 × 2 × 3 | 54 | 45,000 | 86 | 100 | 222.75 |
| 1b | 45 30 | 57 | 997 | 17.8 | ~61 psi | 9 × 2 × 3 | 54 | 45,000 | 86 | 100 | 283.5 |
| 1c | 45 15 | 57 | 1148 | 20.5 | ~71 psi | 9 × 2 × 3 | 54 | 45,000 | 86 | 100 | 344.25 |

In Table 2, row 1a summarizes the exemplary green bale cargo: fifty-four 64×48×32 inch bales of green woody biomass, compressed to about 14.6 lb/ft$^3$, will essentially cube out the maximum transport weight while filling about 86% of the available transport volume (3072/(48×8.3×9)). At an energy value of 9,000 Btu per dry weight pound, this green bale cargo has total energy value of about 222.75 million Btu.

Row 1b indicates that green woody biomass (45% wwb) that is baled to about 17.8 lb/ft$^3$, at a platen pressure of about 61 psi, will dry down to the maximum payload weight at about 30% wwb. The resulting cargo has total energy value of about 283.5 million Btu.

Row 1c indicates that drying green bales down to 15% wwb increases the energy content of the cargo to 344.25 million Btu, provided the green biomass is initially baled at a proportionally higher density (~20.5 lb/ft$^3$, at ~71 psi) to accommodate the greater water loss during dry down to the predetermined maximum payload weight.

In this manner, by selectively producing relatively dense green woody biomass bales for drying to predetermined optimum transport densities, especially by natural evaporation and transpiration under ambient conditions, the long-haul highway transportation and fuel costs per unit energy delivered can be greatly reduced and optimized.

Additional economies can accrue during the baling process by limiting the strength (weight) and power (weight, size, noise, and fuel consumption) of the baler, as explained below, to achieve but not unnecessarily exceed an optimized transport density range selected to accommodate particular biomass types and trailer truck configurations.

The experimental data reported herein was acquired in a bench-top lab baler constructed as disclosed in Example 1, and confirmed using a full-size woody biomass baler that had the requisite minimum strength and power requirements disclosed in Example 2. The full-size baler is described in Example 3.

EXAMPLE 1

Bench Top Lab Baler Materials and Methods

Prior to designing and fabricating the bench-top lab baler, our literature review revealed insufficient prior data for the compression, expansion, and friction properties of compressed woody biomass needed to optimally design a woody biomass baler. By using a lab-scale baler rather than a full-scale machine, material and time were saved in testing and validating hypotheses. The scaling was modeled after the way forces and moments are scaled in homogeneous isotropic materials like steel and aluminum. Woody biomass under pressure can be approximated as an isotropic solid. The pressure-pressure relationships developed in the lab baler were incorporated as explained in Example 2 into the full-scale prototype design described in Example 3.

The lab-scale combined baling and infeed chamber measured 68.8 cm (27 inches) long, of which 49.5 cm (19.5 inches) was the enclosed baling chamber. The platen and end wall were 29.2×29.2 cm (11.5×11.5 inches).

The bulk of the lab baler structure was made from standard 1018 steel in the forms of 50×50×6.4 mm wall (2×2×¼ inch) tubing and 50×50×6.4 mm (2×2×¼) angle. The volume of the bale chamber and infeed chamber was encompassed by six sides. They consisted of three fixed sides, two sides that were part of the L shaped door, and the sixth side was formed by the compression platen. The bottom and right side both extended from the retracted platen to the end wall. While the corners of these sides were welded in place, the two rails of each side were formed by load beams that could sense force exerted perpendicular to the compression platen, either down or to the side. The opposite sides were formed by the door with the left side being full length, and the top being cut short to designate the infeed. The door was hinged along the lower left corner and clamped in two places opposite the hinge, one close to the infeed and one close to the end wall. The sides and ends of the chamber were slotted such that binding twine could be pushed or pulled around the bale in six places, three in each plane perpendicular to the platen motion. The platen and end wall each had nine evenly spaced posts to create the string passages around the ends of the completed bale.

Hydraulic fluid was moved by a Haldex Barnes Power Unit model number 1400011, with a 1.5 kW (2 HP) motor capable of moving 95 cc per second (1.5 gpm) at up to 13.8 MPa (2000 psi). The compression cylinder was controlled by an open center, manual, monoblock valve. For safety, the valve was positioned such that the operator could not have hands in the infeed or baling chamber while operating the valve. Compression was facilitated by an 8.9 cm (3.5") bore by 45.7 cm (18") stroke 20.7 MPa (3000 psi) max cylinder. Maximum force was 85.6 kN (19250 pounds) and the cylinder fully extended in 30 seconds (1.5 cm or 0.6 inches per second). A pressure gauge and a pressure sensor were installed between the directional valve and the base of the cylinder, thus allowing the cylinder pressure to be monitored even when the flow from the pump stopped. A needle valve allowed a finely adjustable flow between the front and rear of the cylinder, and a ball valve allowed oil to escape from the front of the cylinder back to the tank when the direction control was in neutral. A second pressure gauge was located at the pump so pressure could be measured when the control was in reverse.

A wheel type linear position sensor was used to record the position of the platen while hydraulic pressure (from which paten pressure was calculated) and side force (from which Poisson's ratio effect was calculated) were measured. Sensors outputs were recorded simultaneously at 15 times per second.

EXAMPLE 2

Engineering Constraints for Rectangular Woody Biomass Balers

FIG. 2 discloses the range of compression platen pressures requisite to compress woody biomass of various water contents to predetermined transport densities. This information can be used in two ways. The water content of air-dried woody biomass, like old forest slash, can be determined to select an appropriate curve for correlating platen pressure with a predetermined optimum transport density. Alternatively, this information can be used to predict the weight loss resulting from drying green woody biomass bales to lower water contents. In either case the biomass baler's compression system can be routinely fabricated to target the corresponding range of platen pressures requisite to achieve a desired range of transport densities.

In practice, expected bale densities are subject to some variability due to the inherent heterogeneity of mixed woody biomass materials. Nevertheless, by mounting a conventional load cell under the baling chamber, the weight of the woody biomass going into a bale can be monitored during loading and flake formation, and the platen pressure adjusted to achieve a completed bale of targeted density. Acceptable variations in bale density will tend to average out when the bales are loaded into multiple-bale cargoes.

Figure 3:
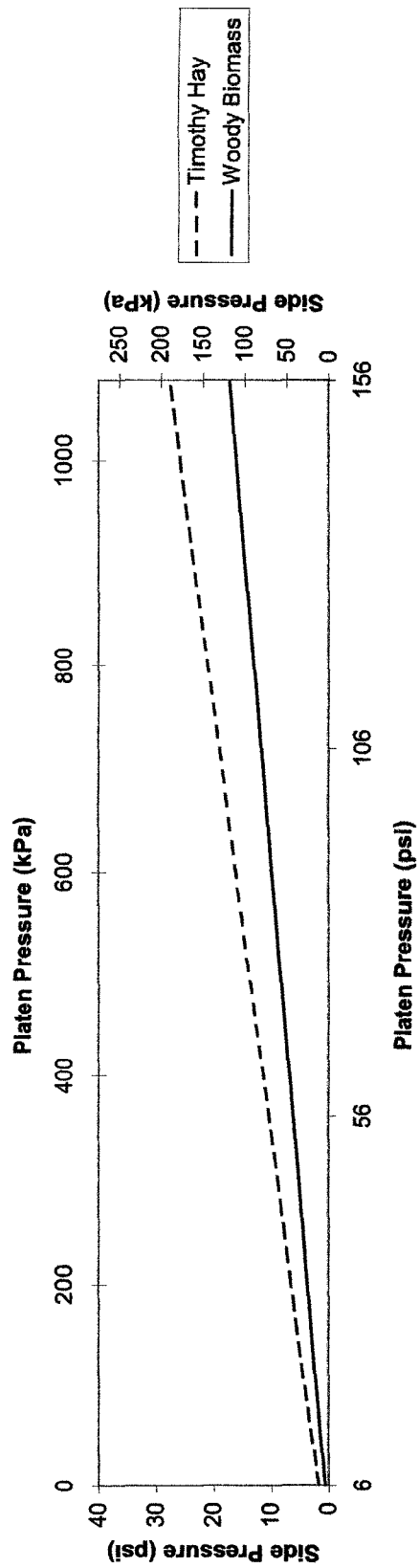
FIG. 3 is a graph that contrasts the Poisson effects of woody biomass and timothy hay.

FIG. 3 discloses that the woody biomass exhibits a Poisson's ratio effect (PR) of approximately 11%. This physical property, which is substantially independent of water content, is required to determine the minimum mechanical strength of a baling chamber for producing woody biomass bales at the requisite platen pressures. The distributed force on the back wall is equal to the force of the platen ($P_p \times A_p$), but the force resisted ($F_w$) by the other baling chamber walls must be at least equal to:

$$F_w = PR \times P_p \times A_w$$

wherein $F_w$ is the distributed load against any one of the chamber walls selected from among the upper wall, the lower wall, and either one of the sidewalls of the rectangular baling chamber, $P_p$ is the maximum pressure that the baler can apply by the compression platen, and $A_w$ is the area of the selected wall. Substituting for the observed Poisson's ratio of compressed woody biomass, then:

$$F_w \geq 0.11 \times P_p \times A_w$$

wherein $A_w$ is expressed in square inches.

In conventional practice, baler manufacturers will add standard factors of safety to such calculated design constraints, as described in the literature, e.g., Shigley 1963. For example, a Poisson's ratio value of 0.5 corresponding to that of solid wood (Wood Handbook 2002) may be selected to calculate an estimated upper strength limit, and a market-driven safety factor (SF) then added to the calculated result. SF is a predetermined design loading multiplier to ensure that the operational loading is not greater than the design loading. In a representative embodiment, such a calculated upper limit for sidewall strength ($0.5 \times P_p \times A_w$) is multiplied by the identical safety factor that the manufacturer chooses to use for the compression platen, in which case SF as applied to the sidewalls is calculated by dividing the predetermined design failure load of the compression platen by the maximum pressure that the baler can operationally apply by the compression platen ($P_p$), such that the design upper limit of the sidewalls is $00.5 \times P_p \times A_w \times SF$).

Bale ejection requires that sufficient force be applied against the bale to overcome the total frictional forces ($F_f$) that the compressed woody biomass applies to the chamber walls (typically steel) that contain it during ejection. We determined using our full-size baler that the coefficient of friction of compressed green woody biomass is approximately 0.60 and decreases as the water content of the biomass decreases. Optionally, coating the baling chamber walls with a low friction material will reduce the applicable $F_f$ value.

For ejection through an open or opened back chamber wall, the bale applies frictional forces against the upper wall, the lower wall, and the two sidewalls. For side ejection, the ejection system must overcome the frictional forces against the platen, lower wall, back wall, and upper wall. Top or bottom ejection systems would be designed to overcome the frictional forces against the platen, back wall, and sidewalls.

The frictional force that the bale applies against any one of the chamber walls is expressed as $F_f = F_n \times C_f$, where $F_n$ is the normal force (calculated below) and $C_f$ is the coefficient of friction of compressed woody biomass on the wall material.

Considering rear ejection, the pressure ($P_w$) that the compressed bale applies against the upper, lower, and two sidewalls is equal to the platen pressure times the Poisson's ratio, or $P_w = P_p \times PR$. Alternatively, $P_w$ can be expressed as the normal force divided by the area of the wall, $P_w = F_n/A_w$.

Assume that the area of the upper and lower walls is $L \times W$; and that of the sidewalls is $L \times H$. Then for each sidewall, $P_w = F_n/(L \times H)$, which converts to $F_n = P_w \times L \times H$. Substituting for $P_w$, then $F_n = P_p \times PR \times L \times H$. Accordingly, for each sidewall:

$$F_f = F_n \times C_f$$

$$F_f = P_p \times PR \times L \times H \times C_f.$$

Similarly, for the upper and lower walls:

$$F_f = P_p \times PR \times L \times W \times C_f.$$

In combination, then, the cumulative frictional forces during rear ejection are:

$$F_f \text{total for rear ejection} = 2(P_p \times PR \times L \times H \times C_f) + 2(P_p \times PR \times L \times W \times C_f).$$

Pursuant to this disclosure, for woody biomass the Pp for optimum transport density is at least 50 psi, PR is 0.11, and $C_f$ is 0.6. Thus, the rear ejection system should control the compression platen to apply at least the following force (in pounds, when L, W, and H are expressed in inches) to eject the bale through the back wall of the baling chamber:

$$F_f \text{total for rear ejection} = 2(P_p \times 0.11 \times L \times H \times 0.6) + 2(P_p \times 0.11 \times L \times W \times 0.6)\, (0.132 \times P_p \times L \times H) + (0.132 \times P_p \times L \times W)\, (0.132 \times P_p \times L)(H + W).$$

For side ejection, the platen and back wall are compressed to the platen pressure, and so for these "sides" of the ejected bale:

$$P_p = F_n/A_p, \text{ or } F_n = P_p \times W \times H.$$

However, the Poisson's ratio effect still applies to the $F_f$ values for the upper and lower walls, as calculated above. Thus, in combination:

$$F_f \text{total for side ejection} = 2(P_p \times W \times H \times C_f) + 2(P_p \times PR \times L \times W \times C_f)\, 2(P_p \times W \times H \times 0.6) + 2(P_p \times 0.11 \times L \times W \times 0.6)\, (1.2 \times P_p \times W \times H) + (0.132 \times P_p \times L \times W)\, (P_p \times W)\, (1.2H + 0.132L).$$

Similarly, top or bottom ejection must overcome the frictional forces against the platen, back wall, and sidewalls. Combining these forces in the manner calculated above, the $F_f$ total for top or bottom ejection of a woody biomass bale compressed to optimum transport density equals at least:

$$F_f = 2(P_p \times W \times H \times C_f) + 2(P_p \times PR \times L \times H \times C_f)\, 2(P_p \times W \times H \times 0.6) + 2(P_p \times 0.11 \times L \times H \times 0.6)\, (1.2 \times P_p \times W \times H) + (0.132 \times P_p \times L \times H)\, (P_p \times H)(1.2W + 0.132L).$$

Most preferably, the baler compression system is configured to compact the woody biomass material with a force between 50 and 71 psi. This optimal range, for the most common case of delivery by highway-legal trucks, encompasses the exemplary dry-down strategies disclosed in the Table 2 above. The baler compression system will typically incorporate one or more hydraulic cylinders to advance the platen and thereby compact the woody biomass material within the baling chamber. The hydraulic system is preferably adjustable by conventional controls to encompass all or a substantial part of this optimal range, in order to permit the operator to select an appropriate platen pressure to achieve a predetermined bale density, taking into consideration initial moisture content, expected dry-down period, and mode of transportation.

The invention accordingly permits an optimized woody biomass transport system including a fleet of semi-trailer trucks that are reversibly loaded at transport intervals with cargoes of parallelepiped bales of woody biomass, wherein the aggregate weight of the loaded bales is at least 80% of the aggregate maximum cargo weight capacities of the loaded semi-trailer trucks, and wherein the aggregate volume of the bales is at least 80% of the aggregate maximum cargo volume capacities of the loaded semi-trailer trucks. The trucks are preferably loaded to at least 85%, and most preferably to at least 90%, of their legal payloads. To further reduce transportation costs, the woody biomass bales should be dried before long-haul transport to average moisture contents of less than 30%, preferably less than 20%, and most preferably less than 15%.

In this manner, conventional semi-trailer trucks can be routinely loaded with woody biomass payloads having energy values of at least 200 million Btu, for economical transport over highway distances of several hundred miles.

One of ordinary skill in the art will readily understand and appreciate that the platen pressure v. bale density relationships disclosed in FIG. 2 are just as useful, mutatis mutandis, to predictably and reproducibly produce bales of woody biomass at predetermined lower transportation densities for short haul or barge transportation, as well as at higher densities for long-haul transport by rail or ship. The cost of hauling the extra air content of low-density bales by barge or short-haul truck is relatively low, and that incremental cost may be more than offset by lower fossil fuel consumption in the baling process. Trains and ships have more constrained payload volumes than barges, and maximum higher payload weights than trucks, and so their cargoes can be cubed out at maximum payload by baling at higher platen pressures, in the substantially constant slope regions of the woody biomass curves in FIG. 2. Accordingly, to accommodate such alternative commercial carriers the compression system can be powered to propel the compression platen within a range of force between 26 and 126 psi, and preferably between 46 and 86 psi. Moreover, FIG. 3 indicates that throughout the noted compression ranges the observed Poisson's ratio of 0.11 applies.

EXAMPLE 3

A Representative Woody Biomass Baling System

Figure 4:
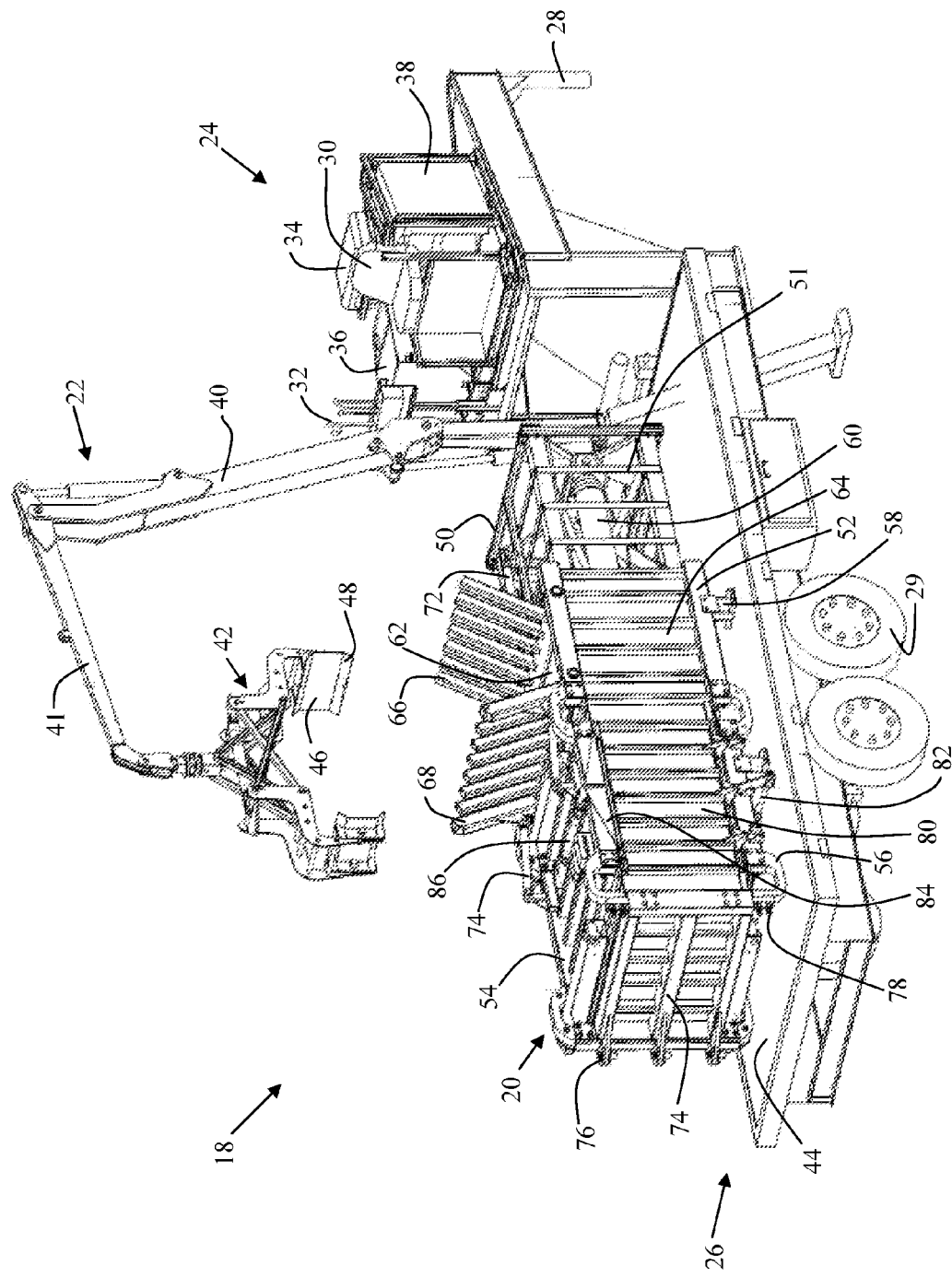
FIG. 4 is an elevated view of a representative woody biomass baler.

FIG. 4 shows a representative woody biomass collection and handling system 18 designed to make and lift parallelepiped bales of woody biomass materials. System 18 is designed especially for small-scale fuels reduction projects in the true wildland-urban intermix zone (WUI), ranging from residential neighborhoods to twenty-acre parcels, for roadside vegetation management, and for prunings.

A representative system 18 has a specialized baling chamber 20, grapple loader 22, and power pack 24 mounted on a street-legal trailer 26 provided with a conventional hitch 28 for towing by a one-ton dual-wheel flat-bed truck (not shown).

Nomenclature with respect to equipment mounted on trailer 26: toward the hitch 28 is referred to herein as "front", and away from the hitch 28 as "rear". It will be understood that either or both the grapple loader 22 and power pack 24 may be mounted on the truck bed (not shown. Alternatively, the baling chamber 20 may be mounted on the front of the trailer 26, with the grapple loader 22 and power pack 24 at the rear. Or, all the equipment can be mounted on a flat bed truck or chassis. In all such transportable configurations, excessive weight must be avoided, and this can be accomplished by incorporating the engineering constraints described in Example 2 into the system design.

Trailer 26 is 'street-legal,' meaning equipped with rubber tires 29 and licensed for use on public roads, which imposes severe design constraints on the system 18: particularly weight (including provision for an undischarged bale), volume, and mass distribution including tongue weight.

Considered front to rear, the power pack 24 includes an operator's seat 30 and controls 32, as well as an engine (not shown), fuel tank 34, battery (not shown), electrical box (not shown), hydraulic fluid reservoir 36, hydraulic fluid surge tank (not shown), and hydraulic fluid radiator 38.

The grapple loader 22 has conventional articulating arms 40, 41 and a specialized claw 42. The arms 40, 41 are selected in length to load biomass from the ground into baling chamber 20, to lift bales discharged from baling chamber 20, and preferably to also extend across baling chamber 20 to rest claw 42 on the trailer bed 44 during transport and storage of system 18. The depicted claw 42 is configured for handling brushy biomass, and is provided with plate grippers 46 for gathering and collecting such materials that are on a solid surface. The steel edge 48 of each plate gripper 46 may be sheathed with polymer, rubber or other elastomeric material to compensate for slight unevenness in streets and graded areas, while also protecting the road surface from scraping. The grapple loader 22 may also be provided with hydraulic scissor shears or one or more chainsaws (not shown) to cut over-length pieces of woody biomass to fit into the baling chamber 20.

The baling chamber 20 receives the woody biomass, compacts the biomass material into parallelepiped bales, and discharges the bales. The baling chamber 20 is preferably constructed of three separate modules, a front end assembly 50, an infeed chamber assembly 52, and a baling chamber assembly 54, that are bolted together by steel connection pieces 56. This modularity makes it convenient to repair or replace failed components. It also makes for low cost and convenient replacement of the baling chamber assembly 54 with alternative modules configured to produce shorter or longer bales. Also shown are steel feet 58 by which the modular baling chamber 20 is bolted to the trailer bed 44.

Considering the modules front to rear, the front end assembly 50 has a welded steel framework 51 that anchors and supports two 7" OD hydraulic cylinders 60 that attach to and move a compression platen 62 back and forth through a compression chamber housed within the infeed chamber assembly 52 and the baling chamber assembly 54.

When retracted forward the compression platen 62 forms the front wall of the infeed chamber assembly 52. A pair of closeable hopper doors 66, 68 form the top of the infeed chamber assembly 52. When raised (as shown here), the hopper doors 66, 68 create an open hopper through which the grapple loader 22 can introduce biomass into the baling chamber. When closed, the hopper doors 66, 68 interlock together. The infeed chamber assembly 52 also has two sidewalls 64 and a floor plate (not shown in this view) that, together with the retracted compression platen 62 and closed hopper doors 66, 68, define the front end or infeed compartment of the compression chamber.

Construction and operation of the hopper doors 66, 68 are disclosed in applicants' U.S. patent application Ser. No. 12/584,810, which is incorporated herein by reference in its entirety. Shown here is a single 2" OD hydraulic cylinder 72 that moves the front hopper door 66, and two 2" OD hydraulic cylinders 74 that move the rear hopper door 68.

The baling chamber assembly 54 houses the rear end or compression compartment of the compression chamber. In the illustrated embodiment a rear wall or end cap that the compression platen 62 compresses biomass against is configured as a contingency door 74 mounted on lateral hinges 76. The contingency door 74 is normally secured shut by bolts 78 to the baling chamber assembly 54. The contingency door 74 can be manually opened, if need be, to expel any problematic biomass loads from the baling chamber, and for this purpose hydraulic cylinders 60 are designed to move the compression platen 62 at least the entire length of the compression chamber.

The depicted baling chamber assembly 54 has a side discharge door 80 that cantilevers downward into a horizontal platform to receive discharged bales. A lower 2" OD hydraulic cylinder 82 lowers and raised the discharge door 80, which is secured closed by an upper lock 84 controlled by a 2" OD hydraulic cylinder 86.

Figure 5:
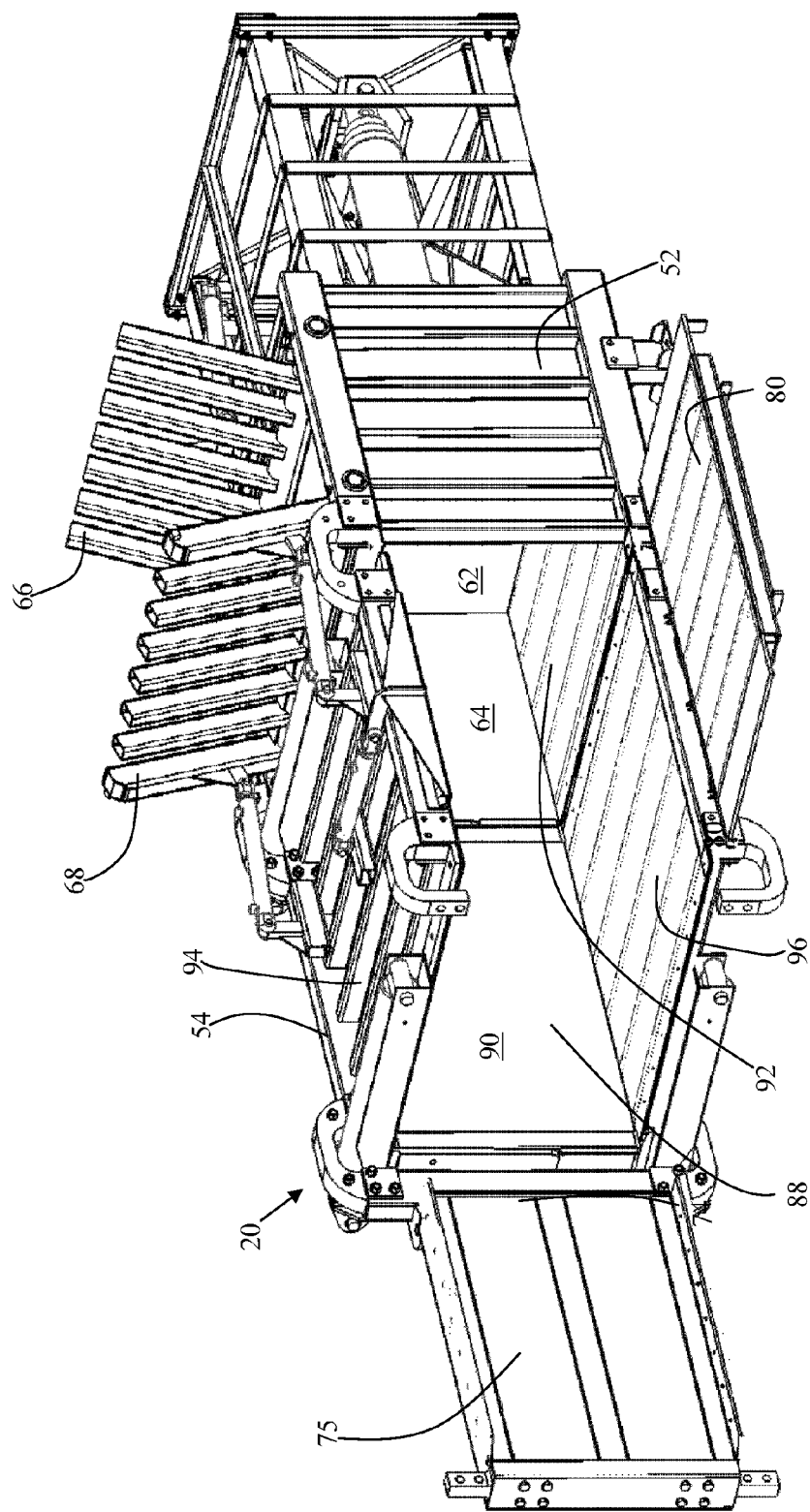
FIG. 5 shows the baler chamber of FIG. 4 with open doors.

FIG. 5 shows the baling chamber 20 (minus the optional trailer) with both the contingency door 74 and the discharge door 80 opened to show the compression chamber 88 and ejection platen 90. Also shown in this view are the floor 92 of the infeed chamber assembly 52 and the upper and lower walls 94, 96 of the baling chamber assembly 54.

Figure 6:
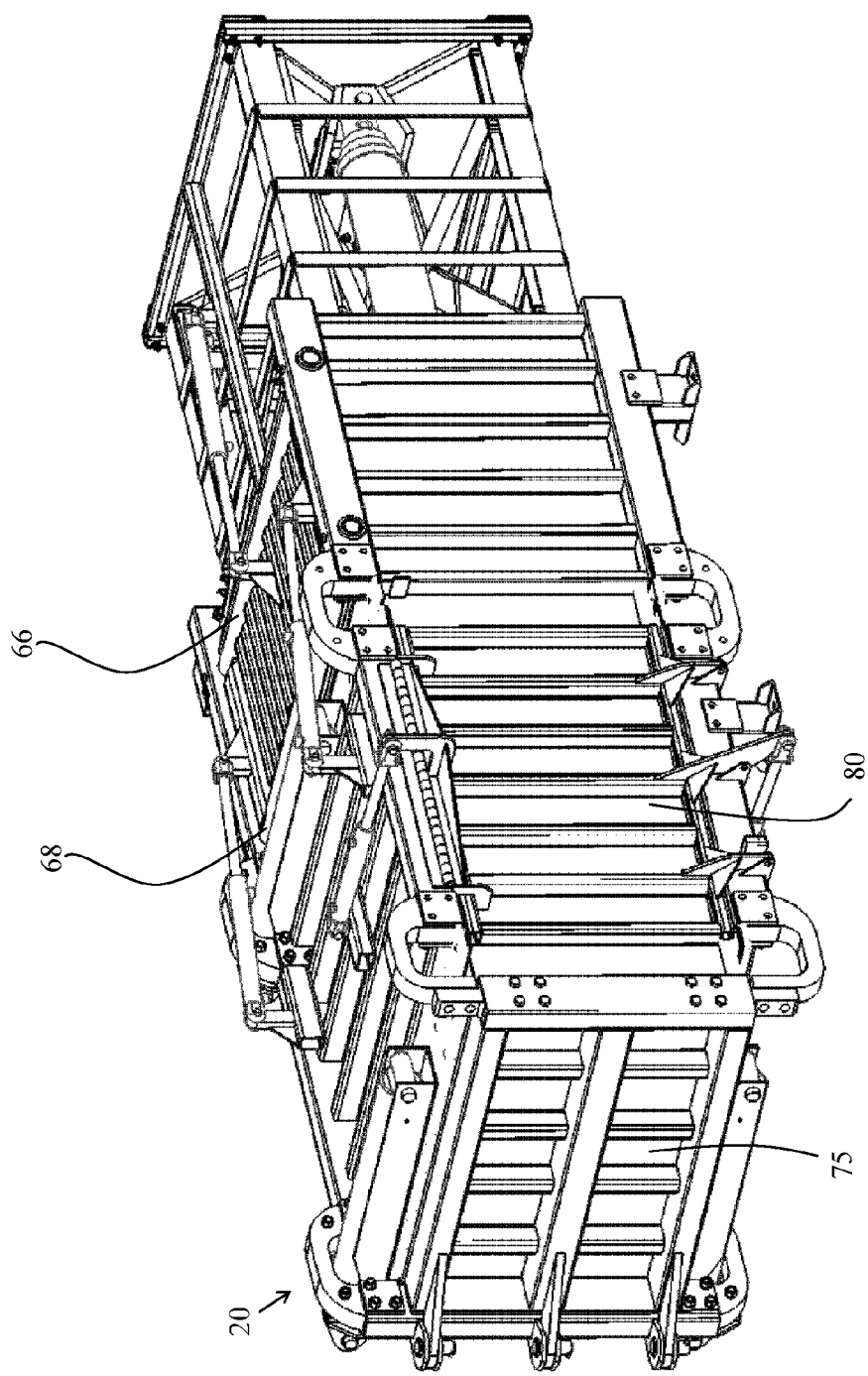
FIG. 6 shows the baler chamber of FIG. 5 with closed doors.

FIG. 6 shows the baling chamber 20 with the hopper doors 66, 68, contingency door 75, and side discharge door 80 in the closed and locked positions.

CITATIONS

The contents of each of the following publications are incorporated in their entireties by reference herein.

Mäkelä, Markku. Oksaraaka-aineen kasaus ja kuljetus. [Bunching and transportation of branch raw material]. Folia Forestalia No. 237. Metsantutkimslaitos, Institutum Forestale Fenniae. Helsinli, Finland; pp. 1-19, 1975.

Danielsson, B. O., et al., Compressing small trees and tree components. Report Nr119-1977. Garpenbert, Sweden, Department of Operational Efficiency, Royal College of Forestry, pp. 1-47, 1977.

Carlsson, T., et al., Lastbilstransport av stubbar, träd., träddelar och hyggesavfall—resultat av studier 1977-79 [Trucking of stumps, full trees, tree sections and logging residue—Study results, 1977-1979], Redogörelse Nr 1 1980, Forskningsstiftelsen Skogsarbeten [Logging Research Foundation, Sweden], Stockholm, Sweden, 36 pages, March 1980.

Säll, H-O., VI Development of harvesters for energy forest plantations, pp. 118-131, In: Proceedings of the International Conference "Harvesting and Utilization of Wood for Energy Purposes" at ELMIA, Jöhköping, Sweden, Sep. 29-30, 1980.

Larsson, M., Development of transportation systems for logging residues, stumps and trees in Sweden, pp. 166-183, In: Proceedings of the International Conference "Harvesting and Utilization of Wood for Energy Purposes" at ELMIA, Jöhköping, Sweden, Sep. 29-30, 1980.

Sinclair, A. W. J., Utilization of coastal British Columbia log sortyard debris, Technical Report No. TR-46, Forest Engineering Research Institute of Canada (FERIC), April 1981.

Jones, K. C. and Associates. A review of energy requirements to commute woody biomass. ENFOR Project P-28. FERIC Special Report No. SR-14. Canadian Forestry Service, Environment Canada, Ottawa, Ont., 1981a.

Jones, K. C. and Associates. Field tests to develop energy saving wood comminution techniques. ENFOR Project P-28. FERIC Special Report No. SR-15. Canadian Forestry Service, Environment Canada, Ottawa, Ont., 1981b.

Hassan, A. E-D., Compaction of Wood Chips—Energy Cost, ASABE Paper No. 76-1568, pp. 1-17, 1976.

Stuart, W. B., and T. A. Walbridge, A new approach to harvesting, transporting, and storing logging residues, pp. 74-83, 1978.

Schiess, P., and K. Yonaka., Baling—a new concept in residue handling; Proceedings, First Technical Conference on Timber Harvesting in Central Rockies, Ft. Collins, 29 pages, Jan. 4-6, 1983; pp. i-iii and 1-26.

Fridley, J. L., and T. H. Burkhardt, Densifying forest biomass into large round bales, Transactions of the ASAE 27 (5) 1277-1281, 1984.

Sturos, J. A. Innovative yard handling for integrated utilization of whole-tree and forest residual biomass. Weyerhaeuser Science Symposium No. 3, Forest to Mill—Challenges of the future, 1980.

Guimier, D. Y., Evaluation of forest biomass compaction systems. Special Report No. SR-30, ENFOR Project P-313, Ottawa, Calif., pp. i-vii and 1-62, August 1985.

Savoie, P., et al., Development of a cutter-shredder-baler to harvest long-stem willow, ASABE Paper No. 061016, 9 pages, Jul. 9-12, 2006.

Dooley, J. H. et al., Utilization of biomass from WUI fuels reduction: Biomass collection and handling from wildland-urban intermix projects on residential and suburban properties; Poster presented at SmallWood 2006, Richmond, Va., May 16, 2006.

Lanning, D. N., et al., Engineering factors for biomass baler design; ASABE Paper No. 078047, presented at the 2007 ASABE Annual International Meeting, Minneapolis, Mich., Jun. 17-20, 2007.

Dooley, J. H., et al., Biomass baling into large square bales for efficient transport, storage, and handling; paper presented at the Council on Forest Engineering 2008: 31st Annual Meeting, Charleston, S.C., Jun. 22-25, 2008.

Dooley, J. H., et al., Square bales of woody biomass for improved logistics, paper presented at the 2009 Society of American Foresters National Convention, Orlando, Fla., Sep. 30, 2009.

Shigley, J. E., Mechanical Engineering Design, McGraw Hill Book Company, NY, pp. 212-213, 1963.

Wood Handbook—Wood as an engineered material, Forest Products Laboratory, USDA Forest Service, Madison, Wis., 2002, pages 60-61 and 64-65.

While the preferred embodiment of the invention has been illustrated and described, it will be appreciated that various changes can be made therein without departing from the spirit and scope of the invention.

We claim:

1. A woody biomass baler comprising:
a baling chamber adapted to receive woody biomass material, and
a compression system adapted to compact the material into a parallelepiped bale in the baling chamber,
wherein the baling chamber comprises a front wall that acts as a reciprocating compression platen corresponding in dimensions to the width W and height H of the bale, opposing upper and lower walls corresponding in dimensions to the length L and either of the width W and the height H of the bale, and opposing sidewalls corresponding in dimensions to the length L and the other of the width W and the height H of the bale, and
wherein each chamber wall selected from among the upper wall, the lower wall, and each of the sidewalls is configured to withstand a distributed force perpendicular to the selected chamber wall of at least (0.11× Pp psi×Aw) pounds, wherein 0.11 is a Poisson's ratio value of compressed woody biomass material, Pp is the maximum pressure that the compression system can apply to woody biomass material in the chamber, and Aw is the area of the selected chamber wall expressed in square inches.

2. The woody biomass baler of claim 1, wherein each chamber wall selected from among the upper wall, the lower wall, and each of the sidewalls can withstand a distributed force perpendicular to the selected chamber wall of not more than (0.5×Pp psi×Aw) pounds, wherein 0.5 is a Poisson's ratio value.

3. The woody biomass baler of claim 1, wherein the compression system is adjustable by conventional controls to apply at least one operator-selectable compression platen pressure of between 26 psi and 126 psi to woody biomass material in the chamber.

4. The woody biomass baler of claim 3, wherein the compression system is adjustable by conventional controls to apply at least one operator-selectable compression platen pressure of between 46 psi and 86 psi to woody biomass material in the chamber.

5. The woody biomass baler of claim 4, wherein the compression system is adjustable by conventional controls to apply at least one operator-selectable compression platen pressure of between 50 psi and 71 psi to woody biomass material in the chamber.

6. The woody biomass baler of claim 1, wherein the baling chamber is mounted on a street-legal trailer or chassis.

7. The woody biomass baler of claim 1, wherein the baling chamber is not mounted on a street-legal trailer or chassis.

8. The woody biomass baler of claim 1, wherein at least one of the sidewalls can be reversibly opened, and further comprising an ejection system adapted to apply a force of at least (Pb×W)(1.2H+0.132L) pounds to move a bale of compacted woody biomass material from the chamber through the opened sidewall, wherein Pb is the compression platen pressure expressed in pounds per square inch that the compression system applies to compact the bale in the chamber, and wherein L, H, and W are expressed in inches.

9. The woody biomass baler of claim 1, further comprising an open or reversibly opened back chamber wall and an ejection system adapted to apply a force of at least (0.132× Pb×L)(H+W) to move a bale of compacted woody biomass material from the chamber through the open or opened back chamber wall, wherein Pb is the compression platen pressure expressed in pounds per square inch that the compression system applies to compact the bale in the chamber, and wherein L, H, and W are expressed in inches.

10. The woody biomass baler of claim 1, wherein either or both of L/W and L/H is equal to or greater than 1.5.

11. The woody biomass baler of claim 10, wherein either or both of L/W and L/H is approximately 2.

12. The woody biomass baler of claim 1, wherein the front wall is characterized by a predetermined design failure load, and wherein a chamber wall selected from among the upper wall, the lower wall, and each of the sidewalls can withstand a distributed force perpendicular to the selected chamber wall of between (0.11×Pp psi×Aw) pounds and (0.5×Pp psi×Aw× SF) pounds, wherein 0.11 and 0.5 are Poisson's ratio values, Pp is the maximum pressure that the compression system can apply to woody biomass material in the chamber, and SF is a safety factor calculated by dividing the predetermined design failure load of the compression platen by Pp.

13. The woody biomass baler of claim 12, wherein the compression system is adjustable by conventional controls to apply at least one operator-selectable compression platen pressure of between 26 psi and 126 psi to woody biomass material in the chamber.

14. The woody biomass baler of claim 13, wherein the compression system is adjustable by conventional controls to apply at least one operator-selectable compression platen pressure of between 46 psi and 86 psi to woody biomass material in the chamber.

15. The woody biomass baler of claim 14, wherein the compression system is adjustable by conventional controls to apply at least one operator-selectable compression platen pressure of between 50 psi and 71 psi to woody biomass material in the chamber.

16. The woody biomass baler of claim 12, wherein the baling chamber is mounted on a street-legal trailer or chassis.

17. The woody biomass baler of claim 12, wherein the baling chamber is not mounted on a street-legal trailer or chassis.

18. The woody biomass baler of claim 12, wherein at least one of the sidewalls can be reversibly opened, and further comprising an ejection system adapted to apply a force of at least (Pp×W)(1.2H+0.132L) pounds to move a bale of compacted woody biomass material from the chamber through the opened sidewall, wherein L, H, and W are expressed in inches.

19. The woody biomass baler of claim 12, further comprising an open or reversibly opened back chamber wall and an ejection system adapted to apply a force of at least (0.132× Pp×L)(H+W) to move a bale of compacted woody biomass material from the chamber through the open or opened back chamber wall, wherein L, H, and W are expressed in inches.

20. The woody biomass baler of claim 12, wherein either or both of L/W and L/H is equal to or greater than 1.5.

21. The woody biomass baler of claim 20, wherein either or both of L/W and L/H is approximately 2.

* * * * *